(12) United States Patent
Nystad et al.

(10) Patent No.: US 9,558,585 B2
(45) Date of Patent: Jan. 31, 2017

(54) HIDDEN SURFACE REMOVAL IN GRAPHICS PROCESSING SYSTEMS

(71) Applicant: ARM Limited, Cambridge (GB)

(72) Inventors: Jorn Nystad, Trondheim (NO); Frode Heggelund, Trondheim (NO)

(73) Assignee: ARM LIMITED, Cambridge (GB)

( * ) Notice: Subject to any disclaimer, the term of this patent is extended or adjusted under 35 U.S.C. 154(b) by 862 days.

(21) Appl. No.: 13/907,550

(22) Filed: May 31, 2013

(65) Prior Publication Data

US 2014/0354640 A1 Dec. 4, 2014

(51) Int. Cl.
*G06T 15/40* (2011.01)

(52) U.S. Cl.
CPC ..................................... *G06T 15/40* (2013.01)

(58) Field of Classification Search
None
See application file for complete search history.

(56) References Cited

U.S. PATENT DOCUMENTS

| | | | | |
|---|---|---|---|---|
| 6,646,639 B1 * | 11/2003 | Greene | ................. | G06T 15/405 345/422 |
| 2010/0007662 A1 * | 1/2010 | Cox | ........................ | G06T 15/40 345/420 |

OTHER PUBLICATIONS

Early Fragment Test, by Open GL.org, Jul. 27, 2013, Available at: http://www.opengl.org/wiki/Early_Depth_Test.

Hidden Surface Removal—12a (Visible Surface determination), 24 pp., Apr. 20, 2009, University of Bath, Department of Computer Science, Bath, UK, Available at: http://www.cs.bath.ac.uk/~djp/30075-CG-12a-hiddenSurfaces.ppt.
Visible Surface Algorithms, Chapter 7, pp. 264-293, Oct. 15, 2005, 2009 Nanjing University of Aeronautics Aeronautical Engineering Experimental Teaching Center, Available at: http://gc.nuaa.edu.cn/hangkong/zjj/cad2/Computer%20graphics%20and%20geometric%20modeling%20implementation%20and%20algorithms/7.pdf.
Examination Report dated Mar. 2, 2016 in GB Patent Application No. GB1409585.5.

* cited by examiner

*Primary Examiner* — Kyle Zhai
(74) *Attorney, Agent, or Firm* — Vierra Magen Marcus LLP

(57) ABSTRACT

A graphics processing pipeline 1 includes a rasteriser 3 that tests patches representing respective different regions of a render output against the edges of primitives 2 to determine if the primitive at least partially covers the patch and an early depth test stage 4 that performs early depth tests for primitives in respect of patches of the render output that the primitive has been found by the rasteriser at least partially to cover, by using depth test information 5 associated with a patch indicating the number and distribution of different depth value regions associated with the patch to determine the depth value region or regions associated with the patch that the primitive should be depth tested against, and then performing a depth test or tests for the primitive in respect of the respective determined depth value region or regions associated with the patch.

19 Claims, 11 Drawing Sheets

| State | First layer | Second layer | Result | Note |
|---|---|---|---|---|
| One solid | □ | ■ | □ | Second layer not present |
| Two solid | ◨ | □ | ◨ | Two individual layers |

□ Solid, full coverage  ◨ Solid, split present

FIG. 7 - Layer States

- If one edge of the primitive matched the splitting edge for the patch:

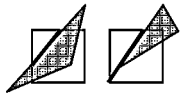
  - If there were two more edges of the primitive within the patch (or a primitive vertex is in the patch), the current splitting edge for the patch is kept, the patch region (layer) with coverage is sent to z/stencil testing (flagged as partially covered) and the non-covered patch region (layer) is kept.

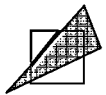
  - If there was one more edge of the primitive within the patch (and no vertex in the patch), the patch region (layer) with coverage is sent to z/stencil testing (flagged as partially covered), but the depth value range for the covered patch region (layer) is kept and the other patch region's (layer's) range / area is expanded, and the other (non-matching) edge of the primitive is used as the splitting edge (boundary) for the patch.

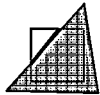
  - If there were no more edges of the primitive within the patch, the existing splitting edge for the patch is kept, the patch region (layer) with primitive coverage is sent to z/stencil testing (flagged with full coverage), and the non-covered patch region (layer) is kept.

FIG. 8A

- If no edge of the primitive matched the splitting edge of the patch

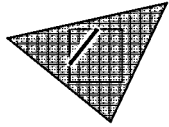
    - If no new edges of the primitive fall within the patch, the existing patch split is removed, and the old patch regions (layers) are combined and tested. (Alternatively, the existing splitting edge could be kept and both regions (layers) tested and updated separately)

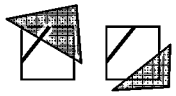
    - If one edge of the primitive falls within the patch, that edge is then used as the splitting edge (boundary) for the patch, and it is detected if a patch region is fully outside or fully inside the primitive or if both are partially covered. If one region is fully outside the primitive that region is kept and the depth value ranges combined for the test. If one region is fully inside, that region is kept for the test and the depth value ranges are combined for the non-covered region. Otherwise, the depth value ranges are combined and used both for the non-covered region and for the test. (Alternatively, both ranges could be tested, if one or more fails, the split kept and the range that passed updated, or if one or more passed or both unsure, the old ranges combined and the new split used)

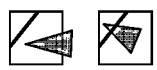
    - If two or more edges of the primitive fall within the patch, the primitive edge with the least number of covered sampling positions in the patch is selected as the new splitting edge to use (as this keeps the largest possible area with the old depth value range), and if which region is fully outside the primitive can be detected, the one inside is combined and the one outside kept, otherwise both regions are combined for the test.

FIG. 8B

- If the patch only had one depth value region (layer) (there was no splitting edge in the patch)

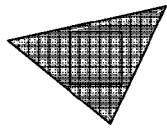
- If no edges of the primitive split the patch, a straight forward depth compare and update is performed (flagged with full coverage)

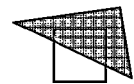
- If one edge of the primitive falls within (splits) the patch, use the primitive edge as a new splitting edge for the patch, keep the old depth value range for the non-covered patch region, and test and update the old depth value range for the covered region of the patch (flagged with full coverage).

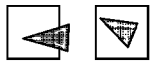
- If two or more edges of the primitive fall within (split) the patch, the split with the least number of covered points is selected (as this keeps the largest possible area with the old depth value range), the old depth value range for the non-covered side (region) is kept, and the old range is tested and updated for the covered side (region) (flagged with partial coverage).

FIG. 8C

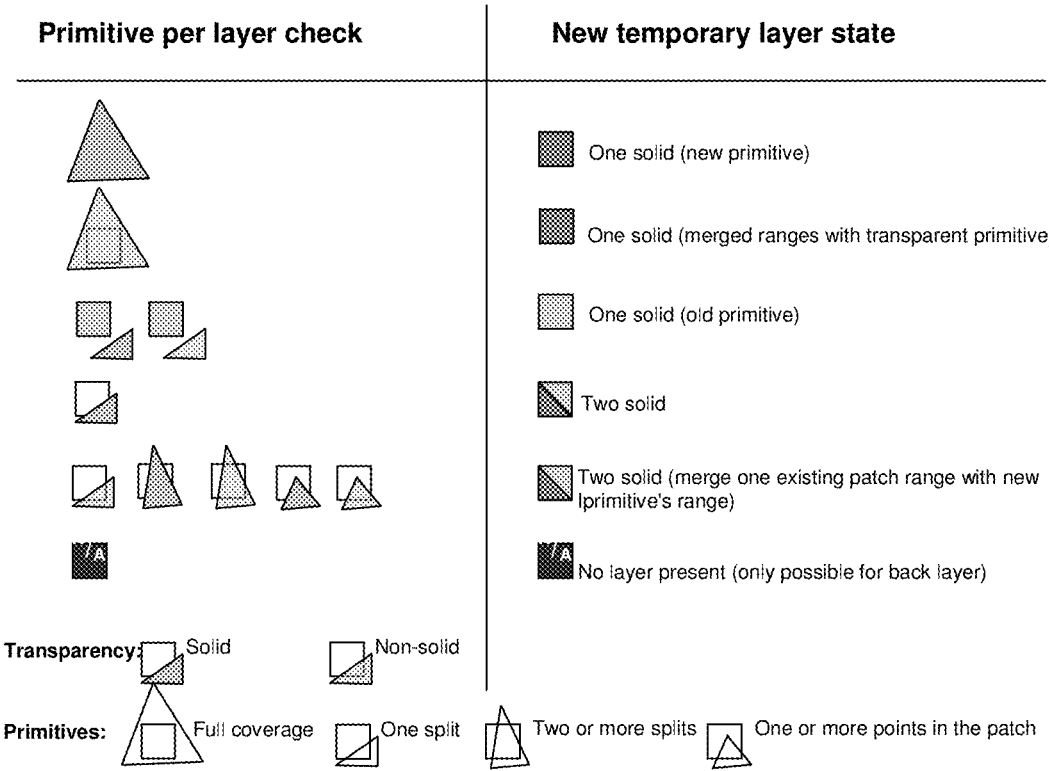
FIG. 9 - per layer update procedure

| First layer | Second layer |
|---|---|
| * | ▨ |
| ▨ | * |

FIG. 10 - Temporary layer combinations that must cover stencil prior to merging

| Temporary layer states | | Combining layers | |
| --- | --- | --- | --- |
| First layer | Second layer | New state | Note |
| * | N/A | * | If there is no back layer then the final layer function is the same as the temporary first layer function |
| ▓ | ▓ | ▓ | Used when both temporary layer functions are the same and stencil result = the same for both layers |
| | | ◩ | The old split is kept if the result of the stencil function has different stencil values per layer. |
| | ░ | ◩ | The temporary layer functions are different. The splitting edge = the old split. |
| | ◩ | ◩ | The split = the new split |
| ░ | ░ | ◩ | Keep the old layer function = Two solid |
| | ▓ | ◩ | Reverse the old splitting edge and set back layer = old front layer while front layer = new layer. |
| | ◩ | ◩ | If front was not covered due to rasterization, Combine new layer with front or back layer depending on split direction. Keep the other layer, set split=new. Else the front layer was not covered due to depth etc. Set back layer = old front, reverse the split and set front = merged back/new. |
| ◩ | ▓ | ◩ | Set front = new layer, back = old front, split = new |
| | ░ | ◩ | If the back layer wasn't even covered before z/stencil, split = new, front=new, back = combine old layers |
| | | ◩ | Else keep old split and back, set front = combined new+front |
| | ◩ | ◩ | Split=new, back = combined old, front = new |

States:  One solid   Two solid

FIG. 11 - merging temporary layer states

HIDDEN SURFACE REMOVAL IN GRAPHICS PROCESSING SYSTEMS

BACKGROUND

The technology described herein relates to the processing of computer graphics, and in particular to hidden surface removal in graphics processing.

As is known in the art, graphics processing is normally carried out by first dividing the graphics processing (render) output, such as a frame to be displayed, into a number of similar basic components (so-called "primitives") to allow the graphics processing operations to be more easily carried out. These "primitives" are usually in the form of simple polygons, such as triangles.

The primitives for an output such as a frame to be displayed are usually generated by the applications program interface for the graphics processing system, using the graphics drawing instructions (requests) received from the application (e.g. game) that requires the graphics processing.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates), e.g. for display.

Once primitives and their vertices have been generated and defined, they can be processed by the graphics processing system, in order, e.g., to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sampling points that should be used for a primitive (i.e. the (x, y) positions of the sample points to be used to represent the primitive in the render output, e.g. frame to be displayed). This is typically done using the positions of the vertices of a primitive.

The rendering process then derives the data, such as red, green and blue (RGB) colour values and an "Alpha" (transparency) value, necessary to represent the primitive at the sample points (i.e. "shades" each sample point). This can involve, as is known in the art, applying textures, blending sample point data values, etc.

(In 3D graphics literature, the term "rasterisation" is sometimes used to mean both primitive conversion to sample positions and rendering. However, herein "rasterisation" will be used to refer to converting primitive data to sampling point addresses only.)

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

(A "fragment" is therefore effectively (has associated with it) a set of primitive data as interpolated to a given output space sample point or points of a primitive. It may also include per-primitive and other state data that is required to shade the primitive at the sample point (fragment position) in question. Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image.)

(It is also the case that as multiple fragments, e.g. from different overlapping primitives, at a given location may affect each other (e.g. due to transparency and/or blending), the final pixel output may depend upon plural or all fragments at that pixel location.)

(Correspondingly, there may be a one-to-one correspondence between the sampling points and the pixels of a display, but more typically there may not be a one-to-one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.)

In one known technique for graphics processing, which is commonly referred to as "immediate mode" graphics processing or rendering, primitives are processed (rasterised and rendered) as they are generated, one after another.

In this type of system, the primitives (their vertices) are passed to the graphics system on a first-come, first-served basis, and primitives are thus rendered in the order that they are received.

It is also known in graphics processing systems to use so-called "tile-based" or "deferred" rendering. In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

In both immediate mode and tile-based rendering, the input to the rasterisation and rendering processes will typically include a list of graphics commands to be executed by the graphics processor. This "command list" will include, as is known in the art, commands instructing the graphics processor to draw primitives, and commands instructing other graphics processes, such as rendering state changes, start and end tile commands (in a tile-based system), etc.

In immediate mode rendering this command list will simply list the commands to be executed one-after-another, whereas in tile-based rendering the list may be, and typically will be, divided into "tiles" (i.e. will list the commands for each tile separately to the commands for the other tiles).

One drawback of current graphics processing systems is that because primitives are processed sequentially, and typically not in perfect front-to-back order, a given sampling point (and hence fragment and pixel) may be shaded multiple-times as an output is processed, e.g. for display. This occurs when a first received and rendered primitive is subsequently covered by a later primitive, such that the rendered first primitive is not in fact seen at the pixel(s) (and sampling point(s)) in question. Primitives can be overwritten many times in this manner and this typically leads to multiple, ultimately redundant, rendering operations being carried out for each render output, e.g. frame, being rendered. This phenomenon is commonly referred to as "overdraw".

The consequences of performing such ultimately redundant operations include reduced frame rates and increased memory bandwidth requirements (e.g. as a consequence of fetching data for primitives that will be overwritten by later primitives). Both of these things are undesirable and reduce the overall performance of a graphics processing system. These problems will tend to be exacerbated as render outputs, such as frames to be rendered, become larger and more complex (as there will be more surfaces in the potentially-visible view), and as the use of programmable fragment shading increases.

The problem of "overdraw" could be significantly reduced by sending primitives for rendering in front-to-back order. However, other graphics processing requirements, such as the need for coherent access to resources such as textures, and the need to minimise the number of API calls per frame, generally mandate other ordering requirements for primitives. Also, a full front-to-back sort of primitives prior to rendering may not be practical while still maintaining a sufficient throughput of primitives to the graphics processing unit. These and other factors mean that front-to-back ordering of primitives for a given render output, e.g., frame, is generally not possible or desirable in practice.

A number of other techniques have therefore been proposed to try to reduce the amount of "overdraw" (the amount of redundant processing of hidden surfaces) that is performed when processing a render output, such as a frame for display (i.e. to avoid rendering non-visible primitives and/or fragments, etc.).

For example, it is known to carry out forms of hidden surface removal before a primitive and/or fragment is sent for rendering, to see if the primitive or fragment etc. will be obscured by a primitive that has already been rendered (in which case the new fragment and/or primitive need not be rendered). Such hidden surface removal may comprise, for example, early occlusion culling, such as early-Z (depth) and/or stencil, testing processes, as is known in the art.

These arrangements try to identify, e.g., sampling points for a new primitive that will be occluded by already processed primitives (and therefore that do not need processing) before the later sampling points are issued to the rendering pipeline. In these arrangements, the depth value, e.g., of a new primitive to be processed at the sampling positions in question is compared to the current depth values for those sampling positions in the depth buffer to see if the new primitive is occluded at the sampling positions in question or not. This can help to avoid sending fragments that are occluded by already processed primitives through the rendering pipeline.

It has also been proposed to use a per-sample or per-fragment sorting pass before sending any fragments to the rendering pipeline so as to identify the front-most fragment for each fragment position before the fragments are issued to the rendering pipeline. This can effectively remove all hidden surfaces, regardless of the order the primitives are received in (as it identifies the fragment that needs to be processed for each fragment position before the fragments are sent for rendering).

However, this arrangement has a fixed cost irrespective of the order that the primitives are received in (i.e. irrespective of the rendering order specified by the application), and has to apply a large number of special cases to handle things like transparency, etc., where the application specified rendering order must be preserved. The cost for this sorting also increases with the number of samples being considered (as it essentially has to sort per sample), thereby making rendering using a high number of samples, such as multi-sampled anti-aliasing, very expensive when using this technique.

It is also known for application (e.g. game) developers to configure the application such that each render output, e.g., frame, is, in effect, rendered twice, first of all to draw all the opaque geometry with all rendering states other than the Z-test and Z-write disabled, and then a second time with full render states enabled.

This has the effect that the first rendering pass effectively fills the Z-buffer with the Z (depth) value of the closest opaque primitive for each sample position. In the second, full rendering pass, as the Z-buffer is now filled with the Z-value of the closest opaque primitive, any early-Z test on the second pass can more effectively reject occluded sampling points, and in particular will take account of all the primitives rendered in the first, "Z-only" rendering pass, not just of primitives that have been rendered ahead of the primitive in question.

This technique therefore can provide a more efficient early-Z test process, but it has the disadvantage that a given render output must be generated by the application and processed by the graphics processing system twice, once for the Z-only pass, and then again for the "full" rendering pass. While this may not be too problematic for higher powered, e.g. desktop, graphics systems, other, lower powered graphics systems, such as for portable and mobile devices, may, e.g., have bandwidth constraints that make generating and rendering each entire potentially-visible render output twice undesirable.

The Applicants believe therefore that there remains scope for improved techniques for hidden surface removal in graphics processing systems.

BRIEF DESCRIPTION OF THE DRAWINGS

A number of embodiments of the technology described herein will now be described by way of example only and with reference to the accompanying drawings, in which:

FIGS. 7, 8A, 8B, 8C, 9, 10 and 11 illustrate the testing and updating of depth values in an embodiment of the technology described herein.

Like reference numerals are used for like components where appropriate in the drawings.

DETAILED DESCRIPTION

Figure 1:
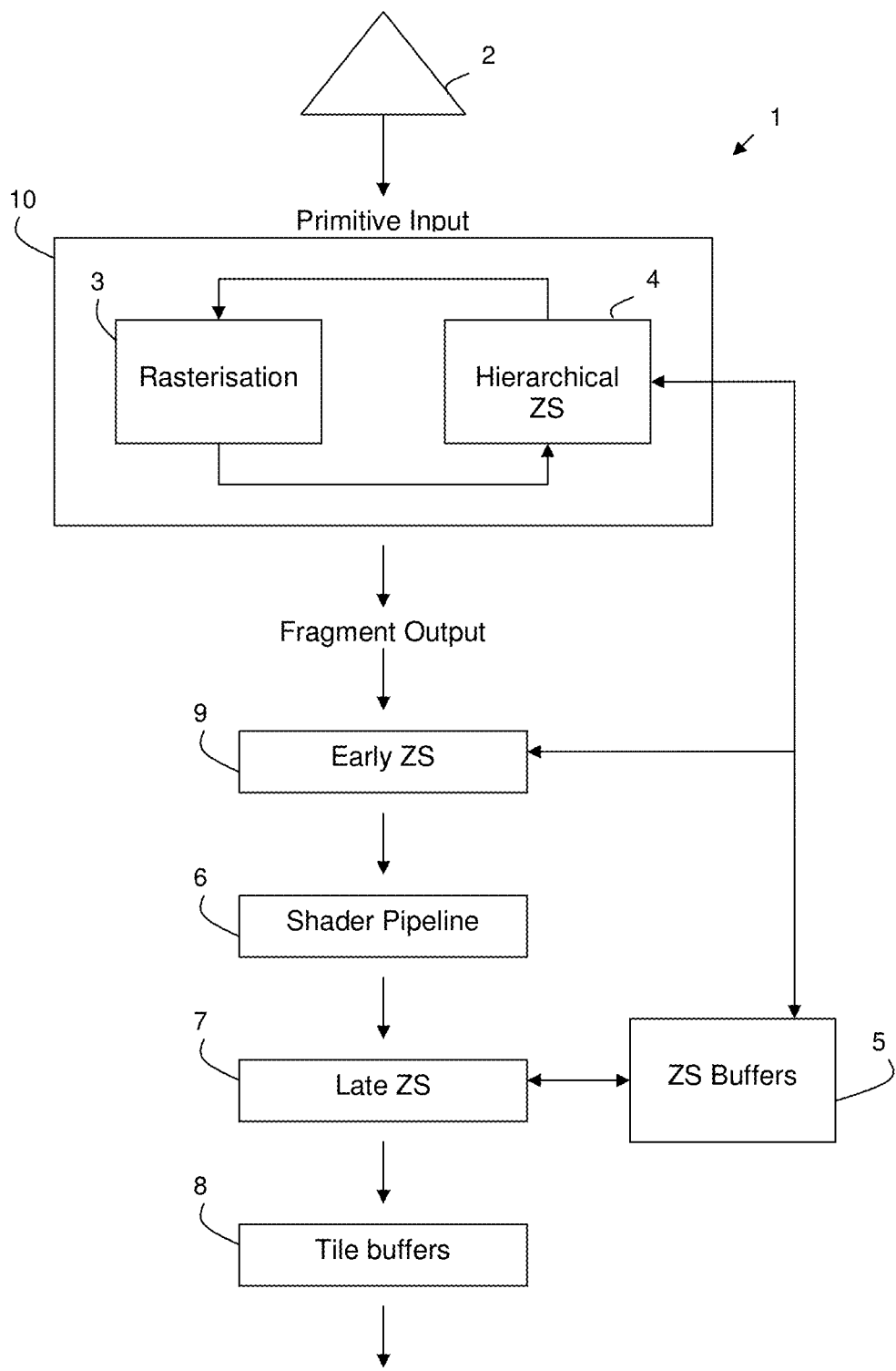
FIG. 1 shows schematically an embodiment of a graphics processing pipeline that can operate in accordance with the technology described herein.

A first embodiment of the technology described herein comprises a method of performing a depth test operation in a graphics processing pipeline that includes a plurality of processing stages including a rasteriser that rasterises input primitives to generate graphics fragments to be processed, each graphics fragment having one or more sampling points associated with it, and a renderer that processes fragments generated by the rasteriser to generate output fragment data; and in which the rasteriser, when it receives a primitive to be rasterised, for each of one or more patches representing respective different regions of a render output to be generated, tests the patch against the edges of the primitive to determine if the primitive at least partially covers the patch; the method comprising:

performing an early depth test for a primitive in respect of a patch of the render output that the primitive has been found by the rasteriser at least partially to cover, by:

determining from depth test information associated with the patch, the number of different depth value regions associated with the patch, and if there is more than one depth value region associated with the patch, the distribution of the depth value regions within the patch; and using the determined number of different depth value regions associated with the patch, and if there is more than one depth value region associated with the patch, the distribution of the depth value regions within the patch, to determine the depth value region or regions associated with the patch that the primitive should be depth tested against; and performing a depth test or tests for the primitive in respect of the patch of the render output using depth values associated with the primitive and with the respective determined depth value region or regions associated with the patch.

A second embodiment of the technology described herein comprises a graphics processing pipeline comprising:

a plurality of processing stages including a rasteriser that rasterises input primitives to generate graphics fragments to be processed, each graphics fragment having one or more sampling points associated with it, and a renderer that processes fragments generated by the rasteriser to generate output fragment data;

and in which the rasteriser, when it receives a primitive to be rasterised, for each of one or more patches representing respective different regions of a render output to be generated, tests the patch against the edges of the primitive to determine if the primitive at least partially covers the patch; the pipeline further comprising:

an early depth test stage that performs early depth tests for primitives in respect of patches of the render output that the primitive has been found by the rasteriser at least partially to cover, by:

determining from depth test information associated with a patch, the number of different depth value regions associated with the patch, and if there is more than one depth value region associated with the patch, the distribution of the depth value regions within the patch; and using the determined number of different depth value regions associated with the patch, and if there is more than one depth value region associated with the patch, the distribution of the depth value regions within the patch, to determine the depth value region or regions associated with the patch that the primitive should be depth tested against; and performing a depth test or tests for the primitive in respect of the patch of the render output using depth values associated with the primitive and with the respective determined depth value region or regions associated with the patch.

In the technology described herein, primitives to be rendered are subject to an early depth test in respect of patches representing regions of the output to be rendered. The patches can incorporate a number of different depth value regions, and it is determined which depth value regions or regions that a patch encompasses that the primitive in question should be tested against. This has the advantage that even though the early depth testing operation is being carried out in respect of patches covering larger areas of the render output (rather than just single sampling positions), it is still possible to denote, where appropriate, different regions of depth values within a given patch. This then allows a more fine grained early depth test against the primitive to be performed, even though the depth test is being considered for patches of the render output rather than single sampling points.

The Applicants believe that the technology described herein can accordingly provide enhanced hidden surface removal in a graphics processing system, because it allows the early depth testing operation to be carried out in respect of larger patches of the render output in one go, but still to be performed in a relatively precise manner. For example, by supporting plural different depth value regions within a patch, that avoids the need to, e.g., simply store a range of depth values that encompasses the entire patch (and then test the primitives against that larger range of depth values). The technology described herein accordingly can allow, for example, more primitives to be culled at the patch testing stage than would be the case where only a single depth value or depth range is stored for each patch as a whole.

The effect of this is that the technology described herein can further reduce the extent to which hidden surfaces are unnecessarily processed in the graphics processing pipeline, as compared, e.g., to existing early-depth testing techniques. Moreover, this is without the need to perform costly per-sample or per-fragment sorting of samples/fragments before rendering takes place.

The depth test that the technology described herein relates to comprises an "early" depth test, i.e. one that is performed before the rendering stage (before fragments are sent to the renderer for processing). In an embodiment, the pipeline includes both an early depth test that tests patches of the render output in the manner of the technology described herein, followed by an early depth test that tests individual sampling points.

The early depth test or tests may be implemented, e.g., as part of the rasteriser, or after the rasteriser (but before the renderer), or as a combination of this (e.g. where there is more than one early depth test). In an embodiment it or they are implemented as part of the rasterisation process and/or after the rasteriser but before the rest of the graphics processing pipeline. Thus, in an embodiment, the rasteriser and rasterisation process is configured to also perform the early depth (Z) testing on the patches of the render output that it is testing against a primitive (to see if the patches of the render output can be discarded from further processing on the basis of the early depth test).

The render output to be generated (and that is divided into patches for the purposes of the technology described herein may comprise any render output that is to be generated by the graphics processing pipeline. Thus it may comprise, for example, a tile to be generated in a tile-based graphics processing system, and/or a frame of output fragment data.

The patches that the render output is divided into for the rasterisation and depth test process can be selected as desired.

The patches in an embodiment all have the same shape, and in an embodiment cover (encompass) a regularly shaped area of the render output. The patches are in an embodiment rectangular (including squares). In an embodiment, the patches are square.

The patches in an embodiment each correspond to a plurality of sampling positions of the render output to be generated. In an embodiment, the patches that the depth test considers comprise patches (sets) of plural fragments. For example, where the rasteriser can rasterise primitives into patches of plural fragments, such patches could then be subject as a whole to the (early) depth test. Thus, in an embodiment the early depth test tests patches (sets) of plural fragments in the manner of the technology described herein.

In an embodiment, there are multiple levels of patches that can be depth tested, with each patch level containing smaller patches than the preceding, higher, larger patch level. In an embodiment each larger patch of the render output is divided into (encompasses) a respective set of plural smaller patches of the render output (which set may contain any desired (plural) number of smaller patches of the render output). Each set of plural smaller patches that a given larger, higher level patch encompasses in an embodiment comprises an integer number of plural smaller patches. In an embodiment, each larger patch is divided into a set of four smaller patches for the depth test process. In an embodiment, each larger patch is to be divided into (encompasses) a 2×2 set (array) of smaller patches.

Thus, in an embodiment, the patches are arranged such that a (and each) larger patch encompasses (and will accordingly be subdivided into) a set four smaller patches, with each smaller patch being a quarter of the size of the larger patch. Varying the patch sizes by a factor of 4 in each successive subdivision level is a particularly a convenient arrangement for progressively decreasing the patch size as the rasterisation and depth test process proceeds. However, it is not essential and other arrangements could be used if desired.

Each patch (within a given level of patches) should (and in an embodiment does) represent a respective different region (area) of the render output to be generated.

Each patch of the render output that is tested in an embodiment corresponds to an integer number of fragments, such as 16×16, 8×8, 4×4 and/or 2×2 fragments. In an embodiment, the largest patches each correspond to 16×16 fragments, with the next smaller second level patches being 8×8 fragments, and the third level, smaller patches being 4×4 fragments (and so on, if desired).

In an embodiment, all the patches at given subdivision level have the same size, and in an embodiment also the same shape, as each other (i.e. in an embodiment cover the same number of sampling positions of the render output).

The patches that the early depth test is performed in respect of should (and in an embodiment do) correspond to patches of the render output that the rasteriser tests for the rasterisation process.

In this regard, the rasteriser of the graphics processing pipeline can be configured to operate in any suitable and desired manner, for example as in known rasterising arrangements. It should, as is known in the art, operate to generate graphics fragments for processing in dependence upon which sampling points (or which sets of sampling points) of an array of sampling points covering the area of the output of the graphics processing pipeline a given primitive, etc., received by the rasteriser covers (at least in part). The rasteriser in an embodiment generates a graphics fragment for each sampling point covered by, and/or for each set of plural sampling points (e.g., sampling mask) found to include a sampling point that is covered by, the (and each) primitive being rasterised.

The rasteriser may be configured to generate the fragments one at a time, but in an embodiment is able to generate plural fragments at a time (simultaneously) (e.g. where a primitive covers plural spatially adjacent sampling points or sets of sampling points). In this case, if the rasteriser simultaneously generates a set of plural fragments, the fragments within the set are in an embodiment still processed individually by the fragment processing parts of the pipeline, such as the fragment shader. Having the rasteriser produce plural fragments simultaneously helps to create back pressure to thereby keep the rendering pipeline "filled up" with fragments.

In the technology described herein, the rasteriser operates to determine whether a primitive being rasterised covers, at least in part, respective patches of the render output to be generated. In this regard, the rasteriser could simply test a single set of patches that the render output is divided into. However, in an embodiment, the rasteriser is a hierarchical rasteriser that operates to iteratively test primitives against progressively smaller patches of the render output (of sampling points) down to a given, in an embodiment selected, in an embodiment predetermined, minimum patch size, discarding any patches that do not cover the primitive (at least in part), and then generates a fragment or fragments for rendering corresponding to the patch or patches of sampling points found to be covered at least in part by the primitive (and that pass the early depth test). As discussed above, each patch of sampling points that is tested in an embodiment corresponds to an integer number of fragments, such as 16×16, 8×8, 4×4 and/or 2×2 fragments.

The rasteriser in an embodiment starts with a large patch of the render target area and tests if the primitive in question is inside that patch. If not, the entire patch is discarded, and the next patch tested, and so on. On the other hand, if a primitive is found to be within the patch (to cover, at least in part, the patch), an (early) depth test for the patch in the manner of the technology described herein is carried out. If the primitive passes the patch depth test (at least in part), the patch is in an embodiment sub-divided, in an embodiment into 4 parts, and each "sub-patch" then tested in the same way, and so on, until a minimum patch size is reached (which in an embodiment corresponds to a 2×2 group of fragments) (but which could, e.g., be an individual sampling point, an individual fragment, or a different sized group of fragments).

Where in this arrangement the smallest patch size contains plural sampling points, the rasteriser in an embodiment then tests the individual sampling points in the final patch to see if they are covered by the primitive, and then generates fragments accordingly. The fragments are then in an embodiment subjected to a per-sampling position early depth test, and if they pass (at least in part) that test, the fragments are sent onwards towards the renderer for rendering.

Where the fragments that are generated by the rasteriser can be associated with (and correspond to and represent) sets of plural sampling points, then each such graphics fragment in an embodiment has associated with it data indicating which of the sampling points in the set of sampling points that the fragment corresponds to are covered (e.g., and in an embodiment, by the primitive being sampled), i.e. in effect, which of the sampling points in the set of sampling points that the fragment corresponds to, the fragment is being used to render.

The information indicating which covered sample points the fragment is being used to render is in an embodiment associated with or part of the fragment data for the fragment that passes through the renderer (such as the RGB and alpha values for the fragment). In an embodiment, it is in the form of a coverage mask that indicates, for each sample position of the set of sample points that is associated with the fragment, whether that sample position is covered, i.e., in effect, whether the fragment is being used to render that sample point (i.e. whether its data should be stored for that sample point). In an embodiment this coverage mask is in the form of a bitmap that represents the sampling positions. The rasteriser in an embodiment generates the coverage masks.

Thus, in an embodiment, the rasterisation process starts by testing the primitive against a first set of larger patches of the render output and progressively subdivides each larger patch of the set that is found to be at least partially covered by the primitive (and for which at least part of the primitive within the patch passes the early depth test (and any other early culling test)) into a set of smaller patches of the render output until a minimum patch size is reached. A fragment or fragments is then generated for rendering for patches found to be covered at least in part by the primitive in question (and for which at least part of the primitive within the patch passes the early depth test (and any other early culling test)).

A primitive to be rasterised could be tested against each patch (e.g. each first level (larger size) patch) that the render output is divided into, or, alternatively, the primitive could be tested against a selected set of patches (e.g. of first level (larger size) patches), such as a set of patches based on the area of the render output that it is expected the primitive will cover, such as the set of patches that are covered by a bounding box generated for the primitive.

The rasteriser and rasterisation process of the technology described herein generates graphics fragments for processing by the rest of the graphics pipeline (such as the renderer) corresponding to patches of the render output that are found to be covered (at least in part) by a primitive. Each fragment in an embodiment represents sampling points (or sets of sampling points) of an array of sampling points covering the area of the render output to be generated. Each fragment generated by the rasteriser may represent (have associated with it) a single sampling point, or plural sampling points, as desired. In an embodiment, each fragment represents a set of plural, in an embodiment a set of four (and in an embodiment a 2×2 array of), sampling points.

The rasteriser in an embodiment generates a graphics fragment for each sampling point covered by, and/or for each set of plural sampling points (e.g., sampling mask) found to include a sampling point that is covered by, the (and each) primitive being rasterised (and that is not otherwise culled from processing for another reason, such as by the primitive failing the early depth test).

The rasteriser can test the edges of the primitive against the patches of the render output in any suitable and desired manner to determine if the primitive covers the patch (at least in part). For example, edge equations for the primitive's edges could be derived, and then tested against the patches of the render output, to see if the patches are covered by the primitive or not.

These tests may be performed as desired. In an embodiment a grid of sampling points is derived for the patch (and for each patch) being tested, and those sampling points then used with (line) equations representing the edges of the primitive in question to determine if the patch is at least partially covered by the primitive.

It will be appreciated from the above that in order to facilitate the technology described herein, it will be necessary to store the relevant depth test information in association with the render output patches that are to be considered. This information is in an embodiment stored in an appropriate depth buffer that is associated with and accessible to the graphics processing pipeline (and to the early depth test stage). Thus, in an embodiment, the graphics processing pipeline has an associated depth buffer that stores depth test information for patches of the render output to be used when performing the early depth test. A set of patch depth test information is in an embodiment stored for each patch of the render output that could potentially be used for a depth test against a primitive.

Thus, in an embodiment the technology described herein further includes when a render output is to be or is being generated by the graphics processing pipeline, storing for a patch, and in an embodiment each patch, of the render output that a primitive to be rendered can be early depth tested against, data indicating the number of different depth value regions associated with the patch, and if there is more than one depth value region associated with the patch, indicating the distribution of the depth value regions within the patch.

It is believed that storing of such depth test information in association with patches of a render output being generated may be new and advantageous in its own right.

Thus, another embodiment of the technology described herein comprises a method of operating a graphics processing pipeline that includes a plurality of processing stages including a rasteriser that rasterises input primitives to generate graphics fragments to be processed, each graphics fragment having one or more sampling points associated with it, a renderer that processes fragments generated by the rasteriser to generate output fragment data, and an early depth test stage that subjects primitives received by the graphics processing pipeline to be rendered to an early depth test before fragments representing the primitives are sent to the renderer for rendering; wherein the early depth test stage performs the early depth test in respect of patches representing respective different regions of a render output to be generated; the method comprising:

when a render output is to be generated by the graphics processing pipeline, storing for each patch of the render output that a primitive to be rendered can be early depth tested against, data indicating the number of different depth value regions associated with the patch, and if there is more than one depth value region associated with the patch, indicating the distribution of the depth value regions within the patch.

Another embodiment of the technology described herein comprises a graphics processing pipeline comprising:
    a plurality of processing stages including:
    a rasteriser that rasterises input primitives to generate graphics fragments to be processed, each graphics fragment having one or more sampling points associated with it;

a renderer that processes fragments generated by the rasteriser to generate output fragment data; and an early depth test stage that subjects primitives received by the graphics processing pipeline to be rendered to an early depth test before fragments representing the primitives are sent to the renderer for rendering; wherein:

the early depth test stage performs the early depth test in respect of patches representing respective different regions of a render output to be generated; and the pipeline further comprises:

a depth buffer that, when a render output is to be generated by the graphics processing pipeline, stores for each patch of the render output that a primitive to be rendered can be early depth tested against, data indicating the number of different depth value regions associated with the patch, and if there is more than one depth value region associated with the patch, data indicating the distribution of the depth value regions within the patch.

As will be appreciated by those skilled in the art, these embodiments of the technology described herein can and in embodiments do include any one or more or all of the features of the technology described herein described herein, as appropriate.

As well as the number of depth value regions and the distribution of those regions within the patch, the depth test information for the patch in an embodiment also indicates the depth values to be used for each depth value region within the patch.

Thus, in an embodiment the technology described herein further includes when a render output is to be or is being generated by the graphics processing pipeline, storing for a patch, and in an embodiment for each patch, of the render output that a primitive to be rendered can be early depth tested against, a set of data for each depth value region associated with the patch indicating the depth values to be used for the respective depth value region of the patch (and from which depth values to be used for the respective depth value region of the patch can be determined).

Similarly, the depth values associated with the respective determined depth value region or regions associated with the patch used when performing a depth test or tests for the primitive in respect of a patch of the render output are in an embodiment determined using a set of depth value indicating data for the patch region in question.

The number of different depth value regions in a patch can be indicated as desired. For example, there could be a flag or flags that can indicate the number of different regions within the patch.

The system could support as many different depth value regions within patches as desired, but in an embodiment the maximum number of depth value regions that each patch can contain is two. In this case therefore, a patch will either contain a single depth value region, or there will be two depth value regions. This could then be indicated by having a single bit for the patch that indicates whether there is a single region or two regions. Where more than two regions within a patch potentially are supported, then the region indicating information should be able to indicate how many depth value regions are present.

The information indicating the distribution of the depth value regions within the patch can take any desired and suitable form. In an embodiment it indicates (allows to be determined) the boundary between the depth value regions in question. In an embodiment, the boundary is in the form of, and defines, a line (an edge) (a "splitting edge") that forms the boundary between (the) two depth value regions in the patch. This "splitting edge" is in an embodiment represented in the form of a line (edge) equation, in an embodiment of the form of $ax+by+c$. In an embodiment the "splitting edge" information indicates the coefficients a, b and c for the edge equation corresponding to the line (edge) that divides the patch into the two regions.

Defining a "splitting edge" for a patch in this way allows two (or more) different regions within a patch to be identified and to, accordingly, have their own particular depth values associated with them, rather than having to have a single set of depth values that must be used for the patch as a whole.

The depth value region boundary (splitting edge) information may also include an indication of which depth value region within the patch lies on the boundary (on the edge), or this may be predetermined (e.g. always set to the same default condition).

Where there are only (up to) two depth value regions in a patch, a single set of edge information to denote the edge (line) forming the boundary between the two regions (where they are present). Where there are more than two depth value regions, there should be corresponding sets of, e.g. edge, information indicating the boundaries between the respective regions within the patch.

The depth values for each depth value region within the patch can be indicated and represented as desired. (As will be appreciated by those skilled in the art, the current depth values for a given patch and patch region that a new primitive is then to be compared with for the early depth test will be based on and determined by the depth values of other primitives that fall within the patch in question (and, e.g., that have already been rendered).)

In one embodiment, the depth values are represented as a range of depth values, i.e. as a minimum depth value and a maximum depth value, to be used for the patch region in question. Thus in one embodiment, the patch depth test uses ranges of depth values for the patches (for the regions of the patches) of the render output. A depth value range or ranges is accordingly in an embodiment stored for some or all of the patches of the render output that may be considered (early depth tested). In this case, a minimum depth value and a maximum depth value is in an embodiment stored and used for the patch region in question.

In another embodiment, the depth values for a patch region are represented by using a functional representation of the depth values (a function to represent the depth values). In this case, the functional representation is in an embodiment in the form of a layer function (a plane function), in an embodiment of the form $ax+by+c$, that describes the depth values within the patch region in question (instead of e.g. having minimum and maximum depth values). This will then allow a primitive to be tested against a depth value function for the patch region in question and not simply a depth value range, thereby, for example, giving greater precision for the depth test across the patch region in question. In this case the layer function co-efficients a, b, c are in an embodiment stored for the patch region in question.

Thus in one embodiment, the patch depth test uses depth value functions (such as layer functions from which the depth values across the patch can be derived) for the patches of the render output. A functional representation or representations of the corresponding depth values is in an embodiment accordingly stored for some or all of the patches of the render output that may be considered (early depth tested).

A depth value layer function may be used in an embodiment, for example, where the region of the patch in question (or the patch in question) is fully covered by a single primitive (whereas a depth value range may be used in an embodiment where more than one primitive covers the patch region in question).

It is believed that the use of layer function is to represent depth values across a patch of a render output that is to be used for depth tests in a graphics processing pipeline may be new and advantageous in its own right.

Thus, another embodiment of the technology described herein comprises a method of operating a graphics processing pipeline that includes a plurality of processing stages including a rasteriser that rasterises input primitives to generate graphics fragments to be processed, each graphics fragment having one or more sampling points associated with it, a renderer that processes fragments generated by the rasteriser to generate output fragment data, and a depth test stage that subjects primitives received by the graphics processing pipeline to be rendered to a depth test; wherein the depth test stage performs the depth test in respect of patches representing respective different regions of a render output to be generated; the method comprising:

when a render output is to be generated by the graphics processing pipeline, storing for one or more patches of the render output that a primitive to be rendered can be depth tested against, data indicating a function from which depth values to be used for the patch can be determined.

Another embodiment of the technology described herein comprises a graphics processing pipeline comprising:

a plurality of processing stages including:
a rasteriser that rasterises input primitives to generate graphics fragments to be processed, each graphics fragment having one or more sampling points associated with it;
a renderer that processes fragments generated by the rasteriser to generate output fragment data; and
a depth test stage that subjects primitives received by the graphics processing pipeline to be rendered to a depth test; wherein:
the depth test stage performs the depth test in respect of patches representing respective different regions of a render output to be generated; and the pipeline further comprises:
a depth buffer that, when a render output is to be generated by the graphics processing pipeline, stores for one or more patches of the render output that a primitive to be rendered can be depth tested against, data indicating a function from which depth values to be used for the patch can be determined.

Another embodiment of the technology described herein comprises a method of performing a depth test operation in a graphics processing pipeline that includes a plurality of processing stages including a rasteriser that rasterises input primitives to generate graphics fragments to be processed, each graphics fragment having one or more sampling points associated with it, and a renderer that processes fragments generated by the rasteriser to generate output fragment data; and in which the rasteriser, when it receives a primitive to be rasterised, for each of one or more patches representing respective different regions of a render output to be generated, tests the patch against the edges of the primitive to determine if the primitive at least partially covers the patch; the method comprising:

performing a depth test for a primitive in respect of a patch of the render output that the primitive has been found by the rasteriser at least partially to cover, by:
determining from depth test information associated with the patch, data indicating a function from which depth values to be used for the patch can be determined; and
using the indicated function to perform a depth test or tests for the primitive in respect of the patch of the render output.

Another embodiment of the technology described herein comprises a graphics processing pipeline comprising:
a plurality of processing stages including a rasteriser that rasterises input primitives to generate graphics fragments to be processed, each graphics fragment having one or more sampling points associated with it, and a renderer that processes fragments generated by the rasteriser to generate output fragment data;
and in which the rasteriser, when it receives a primitive to be rasterised, for each of one or more patches representing respective different regions of a render output to be generated, tests the patch against the edges of the primitive to determine if the primitive at least partially covers the patch; the pipeline further comprising:
a depth test stage that performs depth tests for primitives in respect of patches of the render output that the primitive has been found by the rasteriser at least partially to cover, by:
determining from depth test information associated with the patch, data indicating a function from which depth values to be used for the patch can be determined; and
using the indicated function to perform a depth test or tests for the primitive in respect of the patch of the render output.

As will be appreciated by those skilled in the art, these embodiments of the technology described herein can and in an embodiment do include any one or more or all of the features of the technology described herein described herein, as appropriate.

The indicated depth value function for the patch can be used to perform the depth test(s) as desired. For example, the indicated function could be used to determine one or more depth values for the patch and the depth test or tests for the primitive in respect of the patch of the render output performed using depth values associated with the primitive and the determined depth value or values for the patch. Alternatively, the depth function coefficients for the patch and the depth function coefficients for the primitive could be compared directly.

In an embodiment, each patch is considered effectively to have one or two (or more) depth value layers passing through it, with the respective depth value regions within the patch then being formed by the "visible" portions of the respective depth "layers" (and the splitting edge indicating the boundary between the regions effectively therefore denoting the line within the patch where two depth value layers cross). In this case, the respective depth layers are in an embodiment considered to extend across the whole patch, but where, e.g., there is a second depth value layer across the patch, only a portion of each layer will in fact be "visible" in the patch (thereby forming two depth value regions in the patch) (and so a given depth layer will only fall to be tested against a primitive if the primitive falls within the region of the patch where that depth layer is "visible").

The depth test of a primitive against the depth values for a patch can be performed in any suitable and desired manner. The test is in an embodiment carried out only for patches of the render output that have been found by the rasterisation process to be at least partially covered by the primitive in question.

If the patch that the primitive is being depth tested against contains only one depth value region (one layer), then the primitive being tested should be compared to the depth values for that region as appropriate.

Where the patch contains more than one depth value region (one layer), then in an embodiment it is first determined which region or regions (layer or layers) of the patch the primitive in question should be tested against. This determination in an embodiment uses and takes account of the coverage of the patch by the primitive (i.e. which areas of the patch the primitive actually covers).

In an embodiment, the process determines whether there is a match between an edge of the primitive and a or the boundary between the different depth value regions in the patch (i.e. in an embodiment with a or the edge that splits the patch into the different depth value regions). If there is a match, then (the appropriate) region (layer) within the patch is selected and the depth test comparison performed in respect of that region (i.e. the depth value region that the primitive falls within is determined and the primitive then depth tested against that region). Where there isn't an exact match for the edge of the primitive and the edge (boundary) dividing the patch into respective depth value regions, then in an embodiment the area of the patch that the primitive covers and the area of the patch that each depth value region occupies are considered (e.g. compared), and the patch region to compare the primitive with determined on the basis of that consideration (comparison).

Thus, in an embodiment, if the patch includes two depth value regions (with one splitting edge), it is determined whether an edge of the primitive being tested matches the splitting edge in the patch. In one embodiment, if there is a match, the appropriate depth value region (layer) within the patch to compare with is then selected. If there isn't a match, the coverage of the patch by the primitive and the depth value region (layer) split within the patch are collated and compared, and the depth value region (layer) in the patch to compare with is then selected accordingly.

In another embodiment, if there isn't a match, then in an embodiment the primitive is compared to both regions, or the appropriate region to compare with is attempted to be selected based on the coverage of the patch by the primitive. If the appropriate patch region cannot be determined, then in an embodiment the primitive is either compared to both regions, or the two regions are combined with a conservative function to create a single larger region for the primitive to be compared to.

If two or more (e.g. both) depth value regions of the patch are covered by the primitive, or if the primitive coverage of the depth value regions cannot be determined with sufficient certainty, then in an embodiment the depth values (e.g. ranges) for all the regions (layers) for the patch are combined and then those combined depth values tested against the primitive in question.

The primitive can be depth tested against the identified region or regions of the patch in any desired and suitable manner. In an embodiment a depth value or values associated with the new primitive being processed is compared to the current depth value or values for the patch region in the render output to see if the new primitive is occluded or not. In an embodiment, this is done by deriving appropriate depth values for respective sampling positions within the patch or patch region in question. In an embodiment the sampling positions correspond to a grid of selected sampling positions within the patch, e.g. to respective corners of the patch or corners of the patch region in question.

For the primitive, the depth values at the patch sampling point positions can be determined, e.g. and in an embodiment, using the depth function for the primitive.

For the patch or patch region, where the depth values for the patch are represented as a depth value function (equation), then that function is in an embodiment used to determine the patch depth values at the respective sampling positions (e.g. corners). Where the patch depth values are represented as a range of depth values (minimum and maximum depth values), then each patch sampling position is in an embodiment allocated the respective minimum and maximum depth value, and two depth tests, one against the minimum depth value at each patch position and one against the maximum depth value at each patch sampling position, are carried out.

Thus, to perform the depth test at the, e.g., sampling positions, a depth value determined for the primitive at each patch sampling position is in an embodiment compared against a corresponding depth value or values derived for the patch for the sampling position or against the corresponding minimum and maximum depth values for the patch sampling position, as appropriate.

The depth tests themselves can be carried out in any suitable and desired manner using the depth values for the determined relevant portions of the primitive and the patch region or regions to be considered, e.g., in the normal manner known in the art and/or used in the graphics processing system in question. They are in an embodiment carried out in an appropriately conservative manner.

The outcome of the depth test for the patch is in an embodiment either that the primitive (fully or partially) passes the test (and so is sent onwards in the pipeline for processing in respect of the area of the patch that it covers), or that the primitive completely fails the depth test across the area of the patch that it covers (in which case the primitive is in an embodiment discarded in respect of the render output area that the patch (region) corresponds to (is not processed further for the render output area in question).)

If the primitive being tested against the patch in question partially or fully passes the depth test, then in an embodiment the depth values (and in an embodiment other depth test information) stored for (associated with) the patch are updated (as appropriate) to take account of the new primitive. This early updating is in an embodiment carried out in an appropriately conservative fashion, so as to avoid any risk that the updates could cause errors in the processing of future primitives, etc.

Thus, if the patch early depth test is passed, any depth buffer, etc., associated with that test and/or that contains data related to that test is in an embodiment updated as well, e.g., and in an embodiment, with the relevant data value(s), e.g. depth value(s), associated with the primitive that passed the early depth test.

The updating process in an embodiment comprises determining whether to continue to use the existing patch region boundary (splitting edge) for the patch, or to use one of the edges of the primitive as a new boundary (splitting edge) that divides the patch into the different depth value regions (layers). This selection is in an embodiment based on whether an edge of the primitive matched the existing region boundary (splitting edge) for the patch, how many edges of the primitive cross the patch, and/or the area of the patch that falls inside or outside the primitive.

Thus, in an embodiment the stored patch depth test data updating process comprises comparing the edge or edges of the primitive that cross the patch (if any) with the current splitting edge (region boundary), if any, defined for the patch, and determining whether to use an edge of the primitive as a new edge dividing the patch into different depth value regions in place of the original edge splitting the patch on the basis of the comparison.

In an embodiment, the process determines whether the patch should no longer be divided into different regions. This may be appropriate where the new primitive completely covers the patch.

As well as considering whether to change, and if necessary changing, the boundary (edge) that divides the patch into different regions, it is in an embodiment also considered whether the depth values for the respective region or regions that are covered by the primitive should be updated (and how that update should be performed). In an embodiment, this is based on and/or takes account of which region or regions of the patch were covered by the primitive and the extent to which the region or regions were covered by the primitive.

Thus, the updating process in an embodiment includes determining which region or regions (layer or layers) within the patch need to be updated as a result of the new primitive passing the depth test.

A patch or patch region that is fully covered by the new primitive is in an embodiment (and will be) set to the new primitive's depth test value(s), e.g. depth value function (or depth test range over the patch or patch region in question).

Partially covered patches, where two primitives (i.e. the new and an "old" primitive) share the patch coverage, in an embodiment have a depth value range encompassing both primitives, and/or two depth test value functions or depth value ranges, e.g. two depth layer functions or depth value ranges, one for each primitive, associated with (stored for) them.

Partially covered patch regions, where two primitives share the patch region coverage, in an embodiment have a depth value range encompassing both primitives associated with (stored for) them.

Where a primitive is found to cover both (or plural) regions within the patch, such that multiple depth value regions (layers) need to be updated, then in an embodiment this updating is done by testing the primitive against both (or all) covered regions individually, and then creating a temporary region (layer) state for each region (layer) in the manner discussed above. Once this has been done, the two (or more) temporary region (layer) states (one for each region) are in an embodiment merged to give a resulting region (layer) state to be used for the patch. The merging process in an embodiment takes account of any stencil values associated with the patch regions in question.

In an embodiment, particularly where there are several options of which regions to merge when merging different temporary region states, the merging is done so as to prioritise having accurate stencil states over having depth functions, and/or to prioritise smaller depth ranges over larger depth ranges (such that having smaller depth ranges takes priority over larger depth ranges).

Although the technology described herein has been described above with particular reference to an early depth test, the principles of the technology described herein can similarly be applied to other forms of early culling test, such as the stencil function. In this case, a given patch of the render output can again in an embodiment be divided into different regions, with each different region being associated with a respective set of, e.g. stencil function, values. In the case of the stencil test, the stencil values in an embodiment take the form of minimum and maximum ranges for the patch regions in question.

Thus, in an embodiment, each patch region (and each patch) has a stencil value associated with it as well as a depth value, and the primitives are subjected to a stencil test for each patch as well as a depth test. Similarly, any stencil values associated with a patch or patch region are in an embodiment updated on the basis of the stencil test.

Where the technology described herein is being applied to both early depth and stencil tests (e.g.), then in an embodiment, any division of a patch into multiple regions is the same for both the depth and stencil functions (e.g, the splitting edge that is used to divide the patch into different regions for the stencil function is in an embodiment the same splitting edge as is used to divide the patch into different regions for the depth test).

The renderer of the graphics processing pipeline should be operable to render (shade) graphics fragments it receives to generate the desired output graphics fragment data, as is known in the art. It may contain any suitable and desired rendering elements and may be configured in any suitable and desired manner. Thus, for example, it may comprise a fixed function rendering pipeline, including one or more fixed function rendering stages, such as texture mappers, blenders, fogging units, etc. In an embodiment the renderer comprises a fragment shader (a shader pipeline) (i.e. a programmable pipeline stage that is operable to and can be programmed to carry out fragment shading programs on fragments in order to render them). The technology described herein may be particularly advantageous where fragment shading is being used, as fragment shading can be a relatively costly process, and so more efficient early removal of hidden surfaces is particularly advantageous where fragment shading is being done.

As will be appreciated by those skilled in the art, the renderer will process the fragments it receives to then generate output rendered fragment data, which rendered fragment data is then in an embodiment written to an output buffer, such as a frame buffer, in external memory, for use (e.g. to display a frame on a display). The rendered fragment data may be written to the (external) output buffer via an intermediate buffer, such as a tile buffer (as will be the case in a tile-based graphics processing system), as is known in the art.

Although the technology described herein has primarily been described above with regard to the rasterisation and early depth testing of a single primitive to be processed by the graphics processing pipeline, as discussed, this process should be repeated for each primitive that the graphics processing pipeline receives for processing. Thus, in the case of a tile-based graphics processing system, the above processes will be repeated for each primitive that is to be processed to generate a given output tile of a render target to be generated by the graphics processing pipeline, and then when a given tile has been completed, performed again for the next tile and so on, until all the tiles necessary to generate the desired render output, such as a frame for display, have been processed. The process will then be repeated for the next render output (e.g. frame for display), and so on.

As well as the rasteriser, early depth (and stencil) test stage, and renderer, etc., the graphics processing pipeline can and should include other processing stages that are normally present in graphics processing pipelines, such as tile (and other) buffers, a writeback unit, a blender, a late depth and stencil test stage, etc.

The graphics processing pipeline may also comprise, and in an embodiment does also comprise, and/or is in communication with, one or more memories and/or memory devices that store the data described herein, such as the fragment data, the rendered fragment and output data, the patch depth and other state information (depth value data, etc.), etc., and/or that store software for performing the processes described herein. The graphics processing pipeline may also be in communication with a host microprocessor, and/or with a display for displaying images based on the data generated by the graphics processor.

The technology described herein can be used irrespective of the form of output that the graphics processing system may be providing. Thus, for example, it may be used where the render output is intended to form an image (a frame) for display (e.g. on a screen or printer) (and in one embodiment this is the case). However, the technology described herein may also be used where the render output is not intended for display, for example where the render output is a texture that the graphics processing system is being used to generate (e.g. in "render to texture" operation), or, indeed, where the output the graphics processing system is being used to generate is any other form of data array.

The various functions of the technology described herein can be carried out in any desired and suitable manner. For example, the functions of the technology described herein can be implemented in hardware or software, as desired. Thus, for example, the various functional elements, processing stages, and "means" of the technology described herein may comprise a suitable processor or processors, controller or controllers, functional units, circuitry, processing logic, microprocessor arrangements, etc., that are operable to perform the various functions, etc., such as appropriately configured dedicated hardware elements or processing circuitry and/or programmable hardware elements or processing circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

The technology described herein is applicable to any suitable form or configuration of graphics processing system, graphics processor, and renderer having a "pipelined" arrangement. The graphics processing pipeline can contain any suitable and desired processing stages, etc., that graphics processing pipelines normally include. The technology described herein is particularly applicable to tile-based graphics processors and graphics processing systems, and to multi-core graphics processing systems. Thus, in an embodiment, the graphics processing system is a tile-based graphics processing system. Similarly, in an embodiment, the graphics processing system is a multi-core system (i.e. includes plural graphics processing cores).

The technology described herein accordingly extends to a graphics processor and a graphics processing platform including the apparatus of, or operated in accordance with the method of, any one or more of the embodiments of the technology described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described.

FIG. 1 shows schematically a graphics processor 1 in the form of a graphics processing pipeline that may operate in accordance with the technology described herein.

FIG. 1 shows the main elements and pipeline stages of the graphics processor 1 that are relevant to the operation of the present embodiment. As will be appreciated by those skilled in the art there may be other elements of the graphics processor that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processor as shown in FIG. 1 may be implemented as desired and will accordingly comprise, e.g., appropriate circuitry and/or processing logic, etc., for performing the necessary operation and functions.

The graphics processing system shown in FIG. 1 is a tile-based system. The graphics processor 1 will thus, as is known in the art, produce tiles of a render output data array, such as an output frame to be generated. (The technology described herein is equally applicable to other systems, such as immediate mode rendering systems.) The output data array may, as is known in the art, typically be an output frame intended for display on a display device, such as a screen or printer, but may also, for example, comprise a "render to texture" output of the graphics processor, etc.

FIG. 1 shows schematically the pipeline stages after the graphics primitives (polygons) 2 for input to the rasterisation process have been generated. Thus, at this point the graphics data (the vertex data) has undergone transformation and lighting operations (not shown), and a primitive set-up stage (not shown) has set-up the primitives to be rendered in response to the commands and vertex data provided to the graphics processor 1, as is known in the art.

As shown in FIG. 1, this part of the fragment processing pipeline of the graphics processor 1 includes a number of processing stages, including a rasteriser 10 that includes a rasterisation stage 3 and an early hierarchical ZS (depth and stencil) test stage 4, an early ZS (depth and stencil) test stage 9, a rendering stage in the form of a fragment shading stage 6, and a late ZS (depth and stencil) test stage 7. The pipeline also includes and/or has access to (is in communication with) appropriate memory for storing the data that the pipeline will use and/or generate, such as a depth and stencil buffer(s) 5, tile buffers 8, etc.

The rasteriser 10 operates, as is known in the art, to rasterise the primitives making up the render output (e.g. the image to be displayed) into individual graphics fragments for processing. To do this, the rasteriser 10 receives graphics primitives 2 to be rendered, rasterises the primitives to sampling points and generates graphics fragments having appropriate positions (representing appropriate sampling positions) for rendering the primitives. In the present embodiment, each graphics fragment that is generated by the rasteriser 10 represents (has associated with it) plural (and normally four) sampling positions. (Other arrangements would, of course, be possible). Each graphics fragment has associated with it a coverage mask indicating which sampling points of the plural sampling positions that the fragment represents, it is actually being used to render (i.e. are actually covered by the primitive in question).

In the present embodiment, the rasteriser 10 is a hierarchical rasteriser that operates to iteratively test primitives against progressively smaller patches (regions) of the render output (target) area (and thus, correspondingly, patches of fragments), down to a minimum patch size corresponding, in the present embodiment, to a 2×2 group of fragments (i.e. to an array of sampling points that would be rasterised to a 2×2 group of fragments), discarding any patches that are not (at least in part) covered by the primitive. Each patch that is tested corresponds to a given set of fragments.

The rasterisation stage 3 of the rasteriser 10 performs this render output patch testing. To do this, it starts with a large patch of the render output (the render target) area and tests the patch against the edges of the primitive in question to determine if the primitive at least partially covers any patch of a 2×2 set of smaller patches of the render output (the render target area) that the large patch is divided into (encompasses).

The edges of the primitive are represented by appropriate line (edge) equations that have been derived from the vertices of the primitive, as is known in the art, and a grid of sampling points is derived for the patch (and for each patch) being tested. The patch sampling points are then used with the line equations representing the edges of the primitive in question to perform an edge test for the edges to determine if the patch is at least partially covered by the primitive.

In the present embodiment, the rasterisation stage 3 determines that a patch of the render output is at least partially covered by a primitive if at least one of the following conditions is met: at least one edge of the patch is within the primitive; at least one edge of the patch is crossed by an edge of the primitive; at least one vertex of the primitive is within the patch; or at least one vertex of the primitive is on a patch edge and, if the vertex is on the patch edge, another vertex of the primitive is on another edge of the patch, or if the vertex is on a corner of the patch, another vertex is on the opposite corner or on one of the opposite edges of the patch.

Other arrangements would, of course, be possible.

If it is found that the large patch is not covered by the primitive at all, then the patch is not processed further in respect of the primitive in question (i.e. the entire patch is discarded for the primitive in question), and another (the next) large patch is tested against the primitive, and so on.

On the other hand, if a primitive is found to at least partially cover any of the smaller patches of the set of plural smaller patches of the render output that the large patch encompasses (is divided into) (i.e. the primitive is found to cover, at least in part, the large patch), the large patch is subdivided into its four smaller patches, and each covered such smaller patch ("sub-patch") is then tested against the primitive and processed in the same way (i.e. discarded, or sub-divided into a set of smaller patches, depending upon whether it is covered by the primitive or not).

This patch testing and discarding or subdivision is continued until the minimum patch size is reached.

The present embodiment supports four levels of subdivision (three sub-division iterations) and so starts with large patches corresponding to 16×16 fragments, which are then (if appropriate) subdivided into four 8×8 fragment patches. Each of those 8×8 fragment patches is then subdivided into respective 4×4 fragment patches (if appropriate). Finally, each 4×4 fragment patch is subdivided into respective 2×2 fragment patches (if appropriate). As in the present embodiment, a 2×2 fragment patch is the minimum patch size that is used, the (potential) subdivision process stops at this point. Other arrangements would, of course, be possible.

Figure 2:
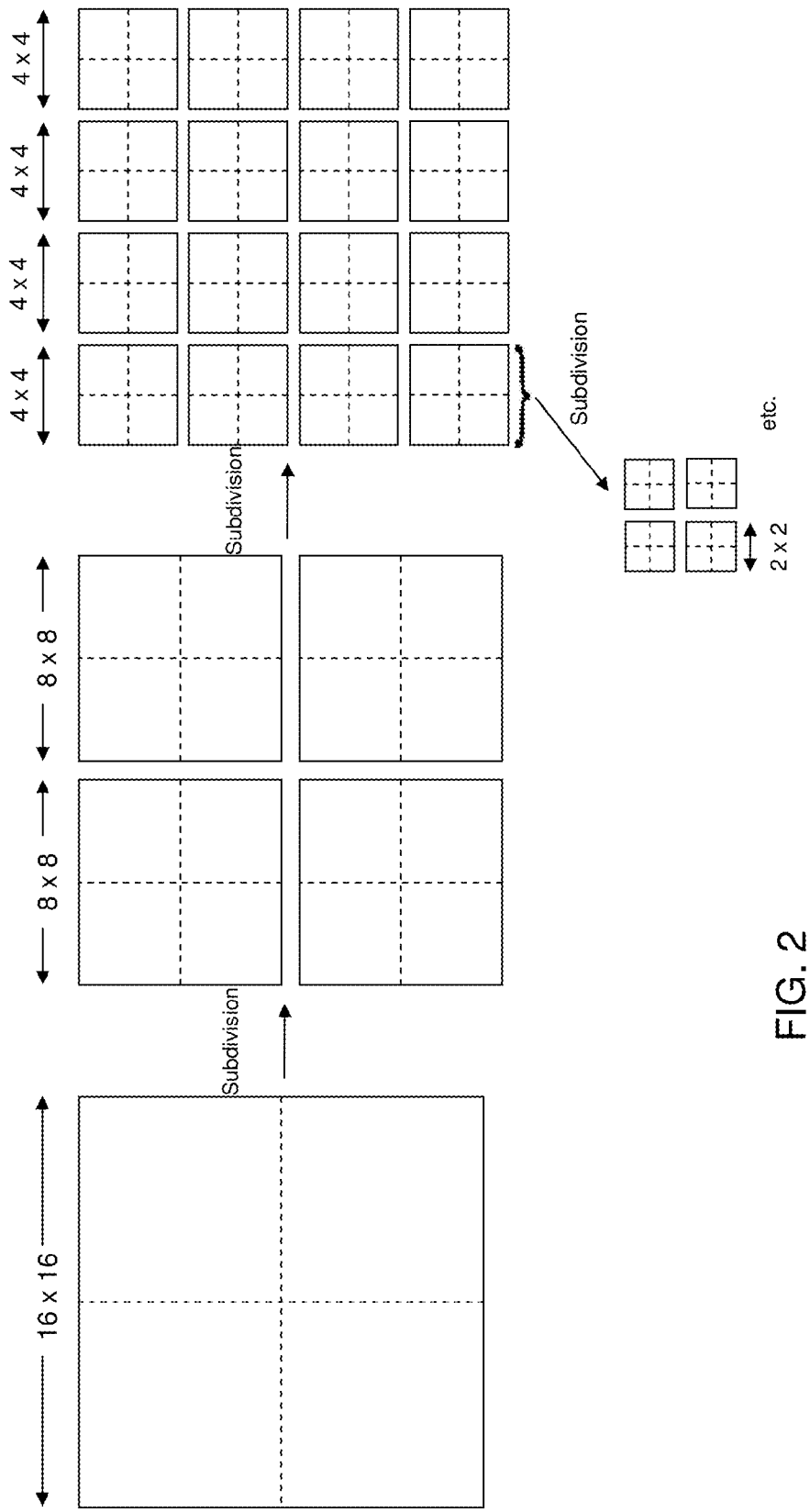
FIG. 2 illustrates the sub-division process that is used by the rasteriser in the described embodiment of the technology described herein.

FIG. 2 illustrates the subdivision process and shows a top level, 16×16 fragment, patch being progressively subdivided down to the minimum patch size of 2×2 fragments.

Once the minimum patch size has been reached (i.e. a patch of 2×2 fragments that covers, at least in part, the primitive has been identified), the rasterisation stage 3 then tests the individual sampling points in that final patch to see if the sampling points are covered by the primitive. The rasteriser 10 then generates and outputs individual fragments for rendering corresponding to the sampling points found to be covered by the primitive (so four fragments if all the 2×2 fragments in the minimum size patch are at least partially covered by the primitive).

The rasteriser 10 also associates with each fragment a coverage mask in the form of a bitmap that indicates, for each sample position of the set of sample positions that is associated with the fragment, whether that sample position is covered (i.e., in effect, whether the fragment is being used to render that sampling point (i.e. whether its data should be stored for that sampling point)).

In the present embodiment, the rasterisation process takes each largest-size patch to be tested against a primitive in turn, and sub-divides that patch and then tests the relevant smaller patches (sub-patches) within that largest-size patch, and so on, until all sub-division and testing for that largest-size patch has been completed.

Once this is done, the rasterisation process then moves on to the next first level, largest size patch, and tests that patch, and so on.

Other arrangements would, of course, be possible.

In the present embodiment, each primitive to be rasterised is tested against each first level (larger size) patch of the render output that falls within (is covered by) a bounding box generated for the primitive. Other arrangements would, of course, be possible.

Once all the highest level, largest size patches of the render output have been tested against a primitive (and subdivided or discarded, as appropriate), then the rasterisation process moves on to the next primitive for the render output being generated and so on, until all the primitives for the render output in question have been rasterised.

The process then moves on to the next render output (e.g. tile) to be generated once all the primitives for the render output in question have been rasterised, and so on.

The rasteriser 10 is configured in the present embodiment as a pipeline that can contain and process plural patches at the same time. The rasteriser 10 is also configured to be able to generate plural fragments at a time (simultaneously) (e.g. where a primitive is found to completely cover a patch of the render output that encompasses plural fragments (e.g. plural sampling points or sets of sampling points)). The fragments are still processed individually by the fragment processing parts of the pipeline, such as the renderer (fragment shader). Having the rasteriser produce plural fragments simultaneously helps to create back pressure to thereby keep the rendering pipeline "filled up" with fragments.

Other arrangements would, of course, be possible.

As shown in FIG. 1, the rasteriser 3 also has an early "hierarchical" depth (Z) and stencil testing stage 4 associated with it. This hierarchical depth and stencil testing stage 4 performs "early" depth and stencil tests on the patches generated by the rasterisation stage 3 to see if those patches can be culled.

To do this, each patch of the render output generated by the rasterisation stage 3 is sent to the early hierarchical depth and stencil test stage 4, which then performs a Z (depth) test on the patch of the render output to see if the patch can be discarded (culled) at this stage. At the same time, an early stencil test is carried out.

If the patch being tested fails the early depth and stencil test, it is discarded (culled) from any further processing.

If the patch being tested passes the early depth and stencil test, it is returned to the rasterisation stage 3 for further subdivision into smaller patches ("sub-patches") as discussed above. Each (covered) "sub-patch" is then returned to the early depth and stencil tester 4 for testing, and so on, until the minimum patch size is reached.

The operation of the early hierarchical depth and stencil testing stage 4 in the present embodiment will be described in more detail below.

The early hierarchical depth and stencil test stage 4 is configured to operate in an appropriately conservative manner.

Once the minimum patch size is reached (a patch of 2×2 fragments in this embodiment), the rasteriser 10 issues fragments that represent the patches (and thus sampling points) that pass the early hierarchical Z and stencil test stage 4 to the remainder of the graphics processing pipeline for processing.

The first part of this processing is to subject each fragment issued (output) by the rasteriser 10 to an early depth and stencil test in the early depth and stencil test stage 9. This early depth and stencil test stage 9 performs depth and stencil tests on the individual (covered) sampling positions associated with the fragments issued by the rasteriser 10 (i.e. at a per-sampling point resolution).

To do this, the early depth and stencil tester 9 uses per-sampling position depth and stencil values stored in the depth and stencil buffers 5. Thus, the depth and stencil buffers 5 store, in addition to the per-patch data for use by the hierarchical depth and stencil tester 4 (as discussed below), an appropriate depth (Z) value and stencil value, respectively, for each sampling point that the buffer represents (essentially for each sampling point position of the tile that is being processed). These values are stored in the depth and stencil buffers 5 when sampling points being tested by the early depth and stencil testing stage 9 and the late depth and stencil testing stage 7 pass the respective depth and stencil tests (the stencil values can be stored/updated when the tests are failed as well).

The depth and stencil buffers 5 are configured as two distinct buffers (although they may in the same physical memory) in this embodiment, one buffer storing per-patch data, and the other storing per-sample depth values. Other arrangements would, of course, be possible.

The early depth and stencil test stage 9 is configured to operate in an appropriately conservative manner, as is known in the art.

Fragments that pass the early depth and stencil test stage 9 (i.e. fragments having at least one associated covered sampling position that passes the early depth and stencil test stage 9) are then sent onwards to the fragment shading stage 6 (the renderer), as shown in FIG. 1.

(Fragments that fail the early depth and stencil test stage 9 are culled by the early depth and stencil test stage 9, as is known in the art.)

The fragment shading stage 6 performs the appropriate fragment processing (rendering) operations on the fragments it receives, so as to process the fragments to generate the appropriate fragment data, etc., for the render output (e.g. for display of the fragments), as is known in the art.

This fragment processing may include any suitable and desired fragment shading processes, such as executing fragment shader programs on the fragments, applying textures to the fragments, applying blending, fogging or other operations to the fragments, etc., to generate the appropriate fragment data, as is known in the art. In the present embodiment, the fragment shading stage 6 is in the form of a shader pipeline (a programmable fragment shader), but other arrangements, such as the use also or instead of fixed function fragment shading units would be possible, if desired.

There is then a "late" fragment Z and stencil test stage 7, which (if it is to be performed, e.g. where a fragment did not undergo the early Z and stencil test) carries out, inter alia, the end of pipeline depth test on the shaded fragments (on the covered sampling points associated with shaded fragments) to determine whether the sampling points that a rendered fragment represents will overdraw the fragments whose values are currently stored in the tile buffer 5 (i.e. determines whether the fragment data for the fragments issuing from the fragment shading stage 6 should be stored in the tile buffers 8 (should replace or modify the fragment data in the tile buffer(s) of the fragments that have already been rendered)).

To do this, the late depth test stage 7 compares the depth values of (associated with) the fragments issued from the fragment shading stage 6 with the (per-sampling position) depth values stored in the depth buffer 5 for the sampling positions in question. The depth values for sampling points that pass the late depth test 7 are also written appropriately to the Z-buffer 5 to update it, as is known in the art.

This late fragment depth and stencil test stage 7 also carries out any necessary "late" alpha and/or stencil tests on the fragments.

The fragments that pass the late fragment test stage 7 are then subjected to any remaining operations necessary on the fragments, such as blending with the framebuffer, dither etc. (not shown).

Finally, the output fragment data values are written to appropriate tile buffers 8 that store, as is known in the art, an appropriate, e.g. colour, value for each sampling point that the buffers represent (in essence for each sampling point of the tile that is being processed).

Once each tile has been processed, its data is, e.g., exported from the tile buffers 8 to a main memory (e.g. to a frame buffer in a main memory) (not shown) for storage, and the next tile is then processed, and so on, until sufficient tiles have been processed to generate the entire render output (e.g. frame (image) to be displayed).

Other arrangements for the fragment processing pipeline would, of course, be possible.

The above describes certain features of the rasterisation and rendering processes of the graphics processing system shown in FIG. 1. Further features of the operation of the graphics processing system shown in FIG. 1 in accordance with embodiments of the technology described herein will now be described.

As discussed above, the rasteriser 10 of the present embodiment operates to test primitives against larger patches of the render output area, and to then progressively subdivide any larger patches that the primitive at least partially covers into smaller patches, test the smaller patches against the primitive and, if necessary, subdivide those smaller patches into even smaller patches, and so on, until a minimum patch size is reached.

Furthermore, each at least partially covered patch of sampling points (of fragments, in effect) generated by the rasteriser is sent to the early hierarchical depth and stencil test stage 4, which performs a Z (depth) test on the patch of sampling points (of fragments) to see if the patch can be discarded (culled) at that stage.

Thus, the early hierarchical depth and stencil test stage 4 performs early depth and stencil tests in respect of the patches of the render output found by the rasterisation stage 3 to be at least partially covered by the primitive that is currently being rasterised.

To facilitate this operation, a set of depth test information is stored in the depth buffer 5 for each patch that the render output could be divided into as part of the rasterisation process (essentially for each patch (size and position) that the rasterisation stage 3 could generate for the tile that is being processed). The hierarchical early depth and stencil tester 4 then uses this stored depth test information to perform a depth test against the parts of the primitive being rasterised that are found to fall within the (and each) patch in question.

In the present embodiment, the depth test information (the depth test state) that is stored for each patch comprises a number of different pieces of data (information).

The depth test information that is stored for each patch firstly comprises an indication of how many depth value regions the patch encompasses. In the present embodiment a patch can either include one or two depth value regions, so this information is in the form of a single bit that, e.g., takes the value "0" when there is only one depth value region for the patch, and the value "1" when there are two depth value regions within the patch.

For each depth value region that is in the patch, an indication of the depth values for that region is also stored. These depth value indications either take the form of a layer (plane) function of the form $ax+by+c$ that can be used to derive depth values across the patch region in question, or comprise an indication of the range of depth values encompassed by the region. Where a depth value layer function is used, the values for the coefficients (a, b and c) of the layer function are stored. Where a range of depth values is used, a minimum depth value and a maximum depth value for the patch region is stored.

Finally, where there are two depth value regions within the patch, an edge equation to indicate the "splitting edge" that forms the boundary between the depth value regions in the patch is also stored. In the present embodiment this edge equation has the form $ax+by+c$ and is stored as the set of fixed point a, b, and c coefficients for the edge equation that describes the "splitting" edge in question.

In the present embodiment, the first depth value region is assumed to cover the splitting edge for the patch where there are two depth value regions, but other arrangements, such as including a state bit to indicate which depth value region covers the edge would be possible if desired.

In the present embodiment, each patch is considered effectively to have one or two depth value layers passing through it, with the respective depth value regions within the patch accordingly being formed by the "visible" portions of the respective depth "layers" (and the splitting edge indicating the boundary between the regions effectively therefore denoting the line within the patch where the two depth value layers cross). Thus, it is assumed that the respective depth layers extend across the whole patch, but where there is a second depth value layer across the patch, only a portion of each layer will in fact be "visible" in the patch (and so a given depth layer will only fall to be tested against a primitive if the primitive falls within the region of the patch where that depth layer is "visible").

Figure 3:
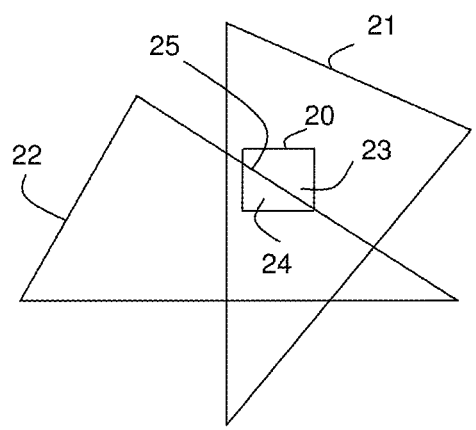
FIGS. 3 and 4 illustrate the patch depth data that is stored in an embodiment of the technology described herein.

FIG. 3 illustrates this and shows two primitives 21, 22 that each lie within an exemplary patch 20 of the render output.

Each primitive 21, 22 will effectively form a depth "layer" through the patch 20, with the "layer" formed by the first primitive 21 being "visible" in the region 23 of the patch, and the "layer" formed by the second primitive 22 being visible in the region 24 of the patch 20 (assuming the second primitive 22 lies in front of (in depth) the first primitive 21). In this case the boundary between the two depth layers (and thus depth value regions) in the patch 20 (the "splitting edge") will be formed by the edge 23 of the primitive 22.

Figure 4:
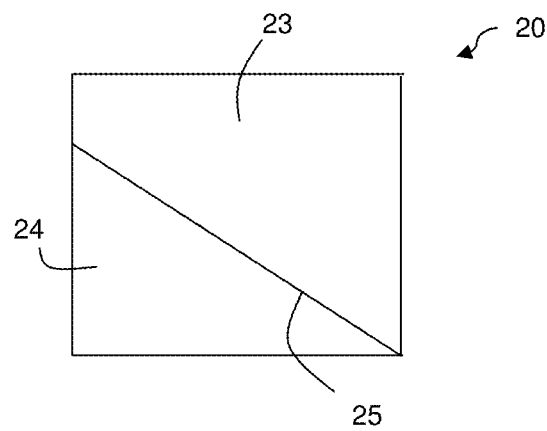

FIG. 4 then shows the corresponding patch depth test state, with the patch 20 having a first depth value region 23 formed by the depth layer defined by the first primitive 21, a second depth value region 24 formed by the second depth layer defined by the second primitive 22, and a "splitting edge" 25 indicating the boundary between the two depth value regions (i.e. the line 25 where the primitives' depth value layers cross).

As discussed above, in the present embodiment a given patch can either have one depth value region (layer), or two depth value regions (layers).

Thus FIG. 7 shows the possible depth value layer (region) "states" a patch can have in the present embodiment (although the second layer is shown as completely covered by a primitive, this is not necessary and the second layer could be only partially covered (e.g. with the first and second layer primitives sharing an edge)).

The depth value range or function that is stored for each patch is initially set to a default value, or to an expected depth value range or function for the patch if that can be determined. (In some arrangements, the possible depth values that primitives for a tile may have may be known in advance. This can then be used to populate the depth buffer 5 with ranges of or functions representing expected depth values for the patches in question.) As is discussed further below, the stored patch depth value ranges or functions, and splitting edge information, etc., are then updated as primitives being tested by the early hierarchical depth and stencil testing stage 4 pass the respective depth tests.

A corresponding set of stencil values to be used for the stencil test is also stored for each depth region that the patch is divided into (the present embodiment uses the same division of the patch into regions for the stencil function as is used for the depth function). (Other arrangements, such as having a different distribution of stencil value regions within a patch would be possible, albeit that in that case more state information would have to be stored for the stencil function for each patch.)

When a patch is to be subjected to the early hierarchical depth and stencil test 4, the early hierarchical depth and stencil test 4 uses the stored patch depth and stencil test information stored in the depth and stencil buffer 5 to perform the test. It also updates, if appropriate (essentially if the new primitive passes, at least in part, the depth and stencil tests), the stored depth and stencil test information for the patch in question. (The stencil test can also trigger an update for a "fail".)

The early hierarchical depth and stencil test 4 first determines which layer or layers (region or regions) of the patch in question to test the primitive against. To do this it first checks the state information indicating the number of layers in the patch. If there is only one layer for the patch, the primitive is simply compared to that one layer.

If the patch includes two depth value regions (with one splitting edge), it is determined whether an edge of the primitive being tested matches the splitting edge in the patch. If there is a match, the appropriate depth value region (layer) within the patch to compare with is then selected. If there isn't a match, the coverage of the patch by the primitive and the depth value region (layer) split within the patch are collated and compared, and the depth value region (layer) in the patch to compare with is then selected accordingly.

If both patch depth value regions (layers) are covered by the primitive, or the coverage is uncertain, minimum and maximum depth value ranges for all the patch depth value regions (layers) for the patch are combined and tested in a single pass.

FIGS. 8A, 8B and 8C set out in more detail the operation of determining the depth value region(s) (layer(s)) that a primitive should be tested against, and how the stored depth test information for a patch is updated in the present embodiment for fully and partially covered patches (as determined by the rasteriser). (If the depth test fails for the primitive, then the existing depth test information for the patch in question is retained.)

Once it has been determined which depth value region or regions (layer or layers) in the patch the primitive should be tested against, each layer that is to be tested is then be tested. To do this, respective depth and stencil values for each corner of the patch are determined for the patch layer in question and for the primitive that is being tested, and then compared in respective depth and stencil tests.

Figure 5:
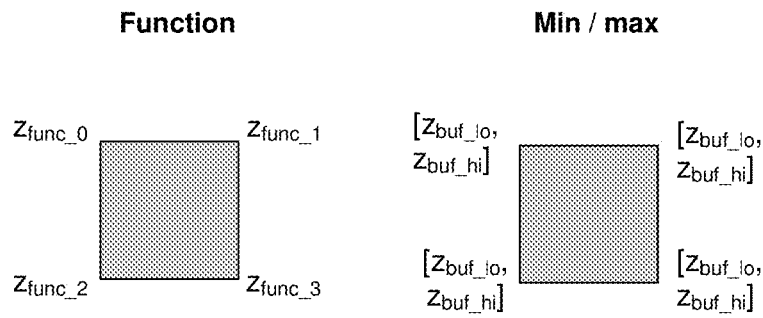
FIGS. 5 and 6 illustrate the determination of depth values in an embodiment of the technology described herein.

The depth values that are determined for each corner of the patch for the or each depth value layer (region) will depend upon how the depth values are represented for the patch. Where the depth values for the patch layer (region) are represented as a depth layer function, then that function is used to derive respective depth values for each corner of the patch. Where the depth values are represented as minimum and maximum values, then each corner of the patch is assumed to have the respective minimum and maximum depth value. FIG. 5 illustrates this and shows the respective depth values that will be derived depending upon whether the depth values for the layer are defined as a function or as a range (minimum and maximum depth values).

Figure 6:
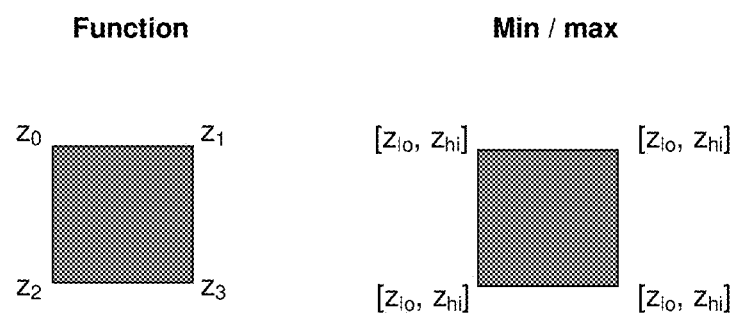

The depth values to use for the primitive for the test are derived using the depth function that is defined for the primitive in question. Where the depth values for the patch layer are defined as a function, then the primitive depth function can correspondingly be used to determine a single depth value for the primitive at each corner of the patch. Where the depth values for the patch layer are in the form of minimum and maximum depth values, then the depth function for the primitive is used to determine appropriate minimum and maximum depth values for the primitive at each corner of the patch. FIG. 6 illustrates this and shows the derivation of the depth values for a primitive where either a depth value function or minimum and maximum depth values are required. This process can also take account of any requirement that forces the primitive's depth values to other values, e.g. depending upon the depth value and stencil value source and whether the depth and stencil values for the primitive could be unknown.

The stencil values for each corner of the patch for the primitive and for the patch region (layer) in question are derived in a corresponding fashion, based on how the stencil values are defined for the primitive and patch layer in question.

Once the depth values for the patch and the primitive have been determined, they are then used to perform a depth test.

The depth test to be used is selected depending on the form of the depth value representation for the patch layer in question. If the patch layer has min/max depth ranges, then a min/max test is applied, otherwise a plane test is applied.

The min/max z-test compares $[z_{lo}, z_{hi}]$ against $[Z_{buf\_lo}, Z_{buf\_hi}]$ to find out if it is greater than, less than or overlapping:

zrange_greater_than=$z_{lo}$>$Z_{buf\_hi}$
zrange_less_than=$z_{hi}$<$Z_{buf\_lo}$
zrange_equal=($z_{lo}$==$z_{hi}$==$Z_{buf\_lo}$==$Z_{buf\_hi}$)
zrange_overlap=!(zrange_greater_than||zrange_less_than||zrange_equal)

The plane test compares $[z_{lo}, z_{hi}]$ against every corner $z_{func\_0}$, $Z_{func\_1}$, $Z_{func\_2}$ and $z_{func\_3}$. The test is similar to the min/max test:

z_greater_than$_x$=$z_{lo\_x}$>$Z_{func\_x}$
z_less_than$_x$=$z_{hi\_x}$<$Z_{func\_x}$
(for each x=0, 1, 2, 3)

This is then further combined as follows:

zrange_greater_than=z_greater_than$_0$ && z_greater_than$_1$ && z_greater_than$_2$ && z_greater_than$_3$
zrange_less_than=z_less_than$_0$ && z_less_than$_1$ && z_less_than$_2$ && z_less_than$_3$
zrange_equal=(z_source==fixed) && (depth_func==plane_func)
zrange_overlap=!(zrange_greater_than||zrange_less_than||zrange_equal)

(zrange_equal compares the coefficients of the depth function directly because even though the evaluated values are equal at the corners it might not mean that they are equal everywhere (although they will be for most cases).)

The z compare function is used to decide if the z function passed, failed or was indeterminate:

z_pass=
(zrange_less_than && z_compare_func[0])||
(zrange_equal && z_compare_func[1])||
(zrange_greater_than && z_compare_func[2])||
z_compare_func==ALWAYS;
z_fail=(!z_pass && !zrange_overlap)||
z_compare_func==NEVER;
z_indet=!z_pass && !z_fail Thus, the results of the depth test will be one of: fully passed; fully passed if not killed by later means; partially passed; partially passed if not killed by later means; or not passed. In the present embodiment fragments can be killed by "later means" (after rasterization) by the following tests/criteria: alpha to coverage; alpha test; shader contains discard; or blend shader contains discard.

If all the tests are passed and the rasterizer mask is full, then the patch is fully covered, otherwise there will be partial coverage or no coverage. Overlapping ranges automatically give partial coverage.

Once the stencil values for the patch and the primitive have been determined, they are then used to perform a stencil test. (The description below describes how to do the stencil test where there is a stencil value range. Where there is only a single stencil value, the same tests can be applied but with s_lo set equal to s_hi.)

Before the stencil test, both the stencil reference value and stencil buffer value are anded with the operation mask. However, if the highest bit is masked off the low/high range is expanded:

s_val_lost_bit=((s_lo^s_hi) & ~stencil_op_mask)!=0
s_lo_anded=s_val_lost_bit? 0x00: ($s_{lo}$ & stencil_op_mask)
s_hi_anded=s_val_lost_bit? stencil_op_mask: ($s_{lo}$, & stencil_op_mask)
s_buf_lost_bit=((s_buf_lo^s_buf_hi)) & ~stencil_op_mask)!=0
s_buf_lo_anded=s_buf_lost_bit? 0x00: ($s_{buf\_lo}$ & stencil_op_mask)
s_buf_hi_anded=s_buf_lost_bit? stencil_op_mask: ($S_{buf\_hi}$ & stencil_op_mask)

The stencil test compares the anded values to find out if they are greater than, less than or overlapping.

stencil_gt=s_lo_anded>s_buf_hi_anded
stencil_lt=s_hi_anded<s_buf_lo_anded
stencil_eq=s_lo_anded==s_hi_anded==s_buf_lo_anded==s_buf_hi_anded
stencil_overlap=!(stencil_gt||stencil_lt||stencil_eq)

Using the stencil compare function it is then decided if the stencil function passed, failed or was indeterminate:

stencil_pass=
(stencil_lt && s_compare_func[0])||
(stencil_eq && s_compare_func [1])||
(stencil_gt && s_compare_func[2])||
s_compare_func==ALWAYS;
stencil_fail=(!stencil_pass && !zrange_overlap)||
s_compare_func==NEVER;
stencil_indet=!stencil_pass && !stencil_fail Three flags are set to indicate which of the stencil operations are likely:

stencil_op_if_sfail_likely=stencil_fail||stencil_indet
stencil_op_if_zfail_likely=!stencil_fail && (z_fail||z_indet)
stencil_op_if_zpass_likely=! stencil_fail && !z_fail The likely stencil operations are collated to calculate a conservative range of stencil values to use. (This range is for the current layer only and might be combined with the other layer during the layer join process.)

In response to the depth and stencil tests, the buffers will be updated as appropriate, and the patch culled (the processing of the patch stopped) if stencil_fail or z_fail, or the patch kept if stencil_pass and z_pass.

Where a primitive covers (at least in part) both depth value regions (visible parts of the depth value layers) of a patch, then the stored depth test information for both layers should be updated appropriately. Such updates are only done if the write mask is on, and are done both when the primitive fully passed and partially passed the depth test.

For these updates, the number of edges of the primitive that cross the patch is only considered within the visible area of each layer (thus there can, e.g., be two or more crossing edges in the patch but zero or only one visible in the layer). Partially passed z/stencil is considered to result in partial coverage, failed z/stencil test results in no coverage, and fragments that can be killed after rasterization are considered to be partial coverage.

When updating multiple layers within a patch, the primitive is first tested towards both layers (if present) individually and a temporary layer state is created for each layer as shown in FIG. 9.

The resulting two temporary layer states are then merged into one layer state for the patch. (The current patch splitting edge (if present) is only used to affect what is considered the full layer area when creating the temporary layer states, it does not affect the temporary split: that is firstly considered when joining the temporary layer states.)

In some cases there will be several options as to which layers to merge when merging different temporary layer states. In such cases, the merging priorities are selected in the present embodiment as follows: having accurate stencil states takes priority over having depth functions; and having small depth ranges takes priority over large depth ranges.

In the present embodiment, some cases require the stencil value to be considered prior to merging the temporary layer states. FIG. 10 shows which temporary layer state combinations have the stencil states explicitly checked and given priority above any other merging in the present embodiment.

Stencil priority merging is done as follows. If the resulting stencil states is three or more and at least one is accurate (min=max), the accurate state with the highest priority according to FIG. 11 is kept, and the rest combined. Otherwise (i.e. where the resulting stencil states is not greater than two valid states or the resulting stencil states is three or more but with no accurate stencil representation) the priority shown in FIG. 11 is followed.

All other cases do not require the stencil value to be considered prior to merging the temporary layer states in the present embodiment. The merging process for these cases is shown in FIG. 11.

The above describes the early hierarchical depth and stencil test operation for a given patch of the render output found to be at least partially covered by the primitive in question. This process will be repeated for each patch of the render output found to be at least partially covered by the primitive in question, and then for the next primitive for the render output processed, and so on.

It can be seen from the above that the technology described herein, in its embodiments at least, comprises a mechanism for further reducing the amount of (ultimately redundant) processing of hidden surfaces that may take place in a pipelined graphics processing system.

The technique of the technology described herein is also independent of the level of multi-sampled anti-aliasing being used, thereby making the use of higher order multi-sampled anti-aliasing significantly cheaper.

This is achieved, in embodiments of the technology described herein at least, by performing early depth tests for primitives in respect of larger patches of the render output which can have different depth value regions associated with them.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of performing a depth test operation in a graphics processing pipeline, the method comprising:

rasterising by a rasteriser, input primitives to generate graphics fragments to be processed, each graphics fragment having one or more sampling points associated with it; and processing by a renderer, fragments generated by the rasteriser to generate output fragment data for use in displaying a frame on a display; and in which method:

the rasteriser, when it receives a primitive to be rasterised, for each of one or more patches representing respective different regions of a render output to be generated, tests the patch against the edges of the primitive to determine if the primitive at least partially covers the patch;

the method further comprising:

performing by early depth test processing circuitry an early depth test for a primitive in respect of a patch of the render output that the primitive has been found by the rasteriser at least partially to cover, the early depth test processing circuitry performing the early depth test by:

determining from depth test information associated with the patch, the number of different depth value regions associated with the patch, and if there is more than one depth value region associated with the patch, the distribution of the depth value regions within the patch; and using the determined number of different depth value regions associated with the patch, and if there is more than one depth value region associated with the patch, the distribution of the depth value regions within the patch, to determine the depth value region or regions associated with the patch that the primitive should be depth tested against; and performing a depth test or tests for the primitive in respect of the patch of the render output using depth values associated with the primitive and with the respective determined depth value region or regions associated with the patch.

2. The method of claim 1, wherein the patches of the render output that the early depth test is performed in respect of correspond to patches of the render output that the rasteriser tests for the rasterisation process.

3. The method of claim 1, further comprising, when a render output is being generated by the graphics processing pipeline, storing for each patch of the render output that a primitive to be rendered can be early depth tested against, data indicating the number of different depth value regions associated with the patch, and if there is more than one depth value region associated with the patch, indicating the distribution of the depth value regions within the patch.

4. The method of claim 1, further comprising, when a render output is being generated by the graphics processing pipeline, storing for each patch of the render output that a primitive to be rendered can be early depth tested against, a set of data for each depth value region associated with the patch indicating the depth values to be used for the respective depth value region of the patch.

5. The method of claim 1, wherein the depth values for each depth value region within a patch are represented as a range of depth values, or by using a functional representation of the depth values.

6. The method of claim 1, wherein the information indicating the distribution of the depth value regions within the patch defines an edge that forms a boundary between two depth value regions in the patch.

7. The method of claim 1, further comprising if the primitive being tested against the patch in question partially or fully passes the depth test, updating the depth test information associated with the patch to take account of the new primitive.

8. The method of claim 7, wherein if a primitive is found to cover plural regions within the patch, such that multiple depth value regions need to be updated, the updating comprises testing the primitive against all covered regions individually, creating a temporary region state for each region and then merging the temporary region states to give a resulting region state to be used for the patch.

9. The method of claim 1, wherein each depth value region associated with a patch also has a stencil value associated with it.

10. A graphics processor comprising:
- rasteriser circuitry that rasterises input primitives to generate graphics fragments to be processed, each graphics fragment having one or more sampling points associated with it; and
- renderer circuitry that processes fragments generated by the rasteriser circuitry to generate output fragment data for use in displaying a frame on a display;
- and in which the rasteriser circuitry, when it receives a primitive to be rasterised, for each of one or more patches representing respective different regions of a render output to be generated, tests the patch against the edges of the primitive to determine if the primitive at least partially covers the patch;
- the processor further comprising:
- early depth test processing circuitry that to perform early depth tests for primitives in respect of patches of the render output that the primitive has been found by the rasteriser circuitry at least partially to cover:
- determines from depth test information associated with a patch, the number of different depth value regions associated with the patch, and if there is more than one depth value region associated with the patch, the distribution of the depth value regions within the patch; and
- uses the determined number of different depth value regions associated with the patch, and if there is more than one depth value region associated with the patch, the distribution of the depth value regions within the patch, to determine the depth value region or regions associated with the patch that the primitive should be depth tested against; and
- performs a depth test or tests for the primitive in respect of the patch of the render output using depth values associated with the primitive and with the respective determined depth value region or regions associated with the patch.

11. The processor of claim 10, wherein the patches of the render output that the early depth test is performed in respect of correspond to patches of the render output that the rasteriser circuitry tests for the rasterisation process.

12. The processor of claim 10, further comprising a depth buffer that, when a render output is being generated by the graphics processing pipeline, stores for each patch of the render output that a primitive to be rendered can be early depth tested against, data indicating the number of different depth value regions associated with the patch, and if there is more than one depth value region associated with the patch, indicating the distribution of the depth value regions within the patch.

13. The processor of claim 10, further comprising a depth buffer that, when a render output is being generated by the graphics processing pipeline, stores for each patch of the render output that a primitive to be rendered can be early depth tested against, a set of data for each depth value region associated with the patch indicating the depth values to be used for the respective depth value region of the patch.

14. The processor of claim 10, wherein the depth values for each depth value region within a patch are represented as a range of depth values, or by using a functional representation of the depth values.

15. The processor of claim 10, wherein the information indicating the distribution of the depth value regions within the patch defines an edge that forms a boundary between two depth value regions in the patch.

16. The processor of claim 10, wherein the early depth test processing circuitry is further configured to if the primitive being tested against the patch in question partially or fully passes the depth test, update the depth test information associated with the patch to take account of the new primitive.

17. The processor of claim 16, wherein if a primitive is found to cover plural regions within the patch, such that multiple depth value regions need to be updated, the updating comprises testing the primitive against all covered regions individually, creating a temporary region state for each region and then merging the temporary region states to give a resulting region state to be used for the patch.

18. The processor of claim 10, wherein each depth value region associated with a patch also has a stencil value associated with it.

19. A non-transitory computer readable storage medium storing computer software code which when executing on a processor performs a method of performing a depth test operation in a graphics processing pipeline, the method comprising:
- rasterising input primitives to generate graphics fragments to be processed, each graphics fragment having one or more sampling points associated with it;
- processing fragments generated by the rasteriser to generate output fragment data for use in displaying a frame on a display; and
- when a primitive is to be rasterised, for each of one or more patches representing respective different regions of a render output to be generated, testing the patch against the edges of the primitive to determine if the primitive at least partially covers the patch; the method further comprising:
- performing an early depth test for a primitive in respect of a patch of the render output that the primitive has been found by the rasteriser at least partially to cover, the early depth test being performed by:
- determining from depth test information associated with the patch, the number of different depth value regions associated with the patch, and if there is more than one depth value region associated with the patch, the distribution of the depth value regions within the patch; and
- using the determined number of different depth value regions associated with the patch, and if there is more than one depth value region associated with the patch, the distribution of the depth value regions within the patch, to determine the depth value region or regions associated with the patch that the primitive should be depth tested against; and
- performing a depth test or tests for the primitive in respect of the patch of the render output using depth values associated with the primitive and with the respective determined depth value region or regions associated with the patch.

* * * * *